United States Patent [19]

Evans et al.

[11] Patent Number: 6,010,726

[45] Date of Patent: *Jan. 4, 2000

[54] ELECTROSTATIC DEPOSITION OF EDIBLE LIQUID CONDIMENT COMPOSITIONS UPON EDIBLE FOOD SUBSTRATES AND THUS-TREATED PRODUCTS

[75] Inventors: Robert J. Evans, Kingport, Tenn.; Gregory S. Reynhout, Kalamazoo, Mich.

[73] Assignee: Kalamazoo Holdings, Inc., Kalamazoo, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/458,675

[22] Filed: Jun. 2, 1995

[51] Int. Cl.$^7$ ..................................................... A23L 1/025
[52] U.S. Cl. ........................... 426/99; 426/235; 426/236; 426/293; 426/417; 426/533
[58] Field of Search ..................................... 426/235–236, 426/293, 99, 417, 533, 650, 302

[56] References Cited

U.S. PATENT DOCUMENTS

| | | | |
|---|---|---|---|
| 1,402,204 | 1/1922 | Alsop | 426/235 |
| 2,685,536 | 8/1954 | Starkey | 427/483 |
| 2,758,535 | 8/1956 | Roberts | 99/261 |
| 2,762,331 | 9/1956 | Henderson | 118/634 |
| 2,764,508 | 9/1956 | Feick | 239/696 |
| 3,399,075 | 8/1968 | Spiller | 427/485 |
| 3,608,821 | 9/1971 | Simm | 239/3 |
| 3,882,255 | 5/1975 | Gorham | 426/235 |
| 3,941,910 | 3/1976 | Asano | 428/457 |
| 4,002,777 | 1/1977 | Juvinall | 427/27 |
| 4,163,066 | 7/1979 | Mason et al. | 426/99 |
| 4,326,454 | 4/1982 | Saurenman | 99/451 |
| 4,743,456 | 5/1988 | Spadafora et al. | 426/293 |
| 4,925,699 | 5/1990 | Fagan | 427/28 |
| 5,209,410 | 5/1993 | Wichmann | 239/696 |
| 5,287,801 | 2/1994 | Clark | 99/451 |
| 5,298,268 | 3/1994 | Maegli | 426/93 |
| 5,385,086 | 1/1995 | Burns | 99/451 |
| 5,391,383 | 2/1995 | Sullivan et al. | 426/99 |
| 5,520,942 | 5/1996 | Sauer, Jr. et al. | 426/302 |

FOREIGN PATENT DOCUMENTS

| | | |
|---|---|---|
| 852689 | 9/1970 | Canada . |
| 2126241A | 3/1984 | United Kingdom . |
| 2177585A | 1/1987 | United Kingdom . |

OTHER PUBLICATIONS

Gorton, "Coating and Topping—Applying the finishing touch"; Baking and Snack, pp. 45–46 and 48 (Aug. 1993).

Pannell, "Electrostatic Coating of Crisps and Snack Foods"; Confectionery Manufacture and Marketing, 17(6), pp. 7–8 (1980).

Chapman, "ABC's of Seasoning"; Snack World, pp. 37–39 (Aug. 1992).

United Air Specialists, Inc. Brochure, "Electrostatic Fluid Spray Systems"; Totalstat®, (Mar. 1994).

*Primary Examiner*—Lien Tran
*Attorney, Agent, or Firm*—The Firm of Gordon W. Hueschen

[57] ABSTRACT

The resistivity properties of an edible base liquid, e.g., a vegetable oil or fluid fat, can be modified by the addition of certain flavoring, coloring, or stabilizing agents such as antioxidants, and if necessary or desirable also an organic diluent, so as to provide an edible liquid flavoring, coloring, or stabilizing composition which is suitable for electrostatic charging and deposition upon an edible food substrate in a uniform and controlled manner. Edible liquid compositions suitable for electrostatic deposition upon an edible food substrate, a method for such deposition, the thus-treated or coated edible food product, and a method for the adjustment and control of the resistivity of an edible material base liquid by the addition thereto of one or more resistivity modifiers, which may be a food-grade flavor or seasoning, coloring, or stabilizer, and if necessary or desirable also an organic diluent, all of the essential ingredients of the composition, method, and edible food product being themselves food-grade edible and ingestible materials, are disclosed.

29 Claims, No Drawings

ELECTROSTATIC DEPOSITION OF EDIBLE LIQUID CONDIMENT COMPOSITIONS UPON EDIBLE FOOD SUBSTRATES AND THUS-TREATED PRODUCTS

BACKGROUND OF THE INVENTION

1. Field of the Invention

Edible liquid flavoring, coloring, or stabilizing compositions suitable for electrostatic deposition upon an edible food substrate, a method for such deposition, the thus-treated or coated edible food substrate, and a method for adjusting and controlling the resistivity of edible liquid compositions with food-grade edible flavoring, coloring, or stabilizing agents, if necessary together with one or more resistivity-modifying edible food-grade organic diluents, so as to make the final composition electrostatically chargeable and depositable upon the edible food substrate, wherein all of the essential ingredients are themselves edible and ingestible materials.

The present application discloses that, by the selection of an appropriate food-grade edible base material selected from oil and fluid fat, which itself has a resistivity higher than the maximum of the range permitting electrostatic charging and deposition thereof at the temperature employed, and one or more edible organic additaments selected from the group consisting of food-grade flavorings and colorings and stabilizers, and if necessary or desirable one or more resistivity-modifying additaments selected from the group consisting of food-grade organic diluents, a final liquid flavoring, coloring, or stabilizing composition can readily be arrived at which has a resistivity suitable for electrostatic charging and deposition at the temperature employed, thereby to effect electrostatic deposition upon an edible food substrate for the purposes of flavoring, coloring, or adding stability thereto. In the selection of suitable ingredients for the aforesaid purposes, reference to the Examples and the Tables hereof will be of assistance to one skilled in the art in arriving at a final composition which is suitable for the intended purposes. Materials herein identified as "resistivity modifiers" reduce the resistivity of a fat or oil when dissolved, emulsified, or dispersed therein, as will be apparent from the Examples and Tables which follow.

2. Prior Art

Electrostatic technology is widely employed in industry to apply coatings to a variety of manufactured articles, including:

metal goods such as rolled steel or aluminum with a coat of lubricating and protecting oil.

automobiles and major appliances with paint in both powdered (later thermally fused) and liquid form.

food products with seasonings.

The technology takes advantage of the attraction/repulsion properties of electrically-charged materials to deliver the coating to the substrate. Charged particles (droplets in the case of a liquid) are accelerated through an electric field and attracted toward the object to be coated which is held at an opposite potential or at electrical ground. Since the like-charged particles tend to repel each other, they coat the object in a uniform manner. Two approaches are generally used for forming the charged particles. In one, uncharged atomized particles or droplets are directed to drift past an electrode charged with a potential on the order of 40 to 300 kilovolts (kV), preferably 80–120 kV. In the corona zone, the air-filled, ionizing region of intense electrostatic activity surrounding the electrode, the particles or droplets pick up an electrical charge and are accelerated toward electrical ground. In a second approach, particularly applicable to liquids, the atomization and charging steps can be effected simultaneously, provided the liquid has a suitable electrical resistivity. When the electrical resistivity is in the range of approximately 0.05–300, preferably about one (1) to 150 megaphm-cm, liquid coming into contact with the high potential electrode is ejected from the electrode surface in a very fine mist of charged droplets. Either approach is applicable according to the present invention, with the latter being preferred.

Application of Liquid Coatings (Non-food)

Most hydrocarbon-based oils have extremely high resistivities (>500 megaohm-cm) and are not suitable for electrostatic application using a single step atomization/charging procedure. Spiller (U.S. Pat. No. 3,399,075) teaches that certain paint compositions, on account of their non-polar nature and very high resistivity, can not be electrostatically atomized and sprayed. He has shown, however, that the resistivities of these compositions can be adjusted by the addition of alkaline earth metal salts in a manner which allows them to be electrostatically sprayed. Juvinal and Kock (U.S. Pat. No. 4,002,777) have found that the same effect can be achieved by adding methanol.

Application of Solids (Foods)

Electrostatic coating technology is in a relatively undeveloped state in the food industry. Several patents describe the use of an electrostatic procedure to precipitate wood smoke on meat products to effect a rapid, economical cure (J. N. Alsop, U.S. Pat. No. 1,402,204, Method of and Apparatus for Treating Organic Substances; L. M. Roberts, U.S. Pat. No. 2,758,535, Electrical Precipitation Apparatus; D. G. Saurenman, U.S. Pat. No. 4,326,454, Ion Treatment Enhancement). These patents are only remotely related to the matter at hand. More closely related are those patents covering the application of solid seasonings to snack foods using electrostatic means. Watkins (Canadian 852,689) describes an apparatus and method for flavoring snack foods with powdered flavorings. Gorham, Lorah and Willis (U.S. Pat. No. 3,882,255) describe a method for flavoring popcorn, in which the popcorn is wetted, charged, and then coated with an electrostatic spray of oppositely-charged solid seasoning particles. Burns (U.S. Pat. No. 5,385,086) and Clark (U.S. Pat. No. 5,287,801), describe different systems for electrostatic application of solid seasonings to snack foods. These processes provide improved seasoning coverage as compared to traditional spraying or bulk mixing methods, but all still suffer from a number of difficulties.

Application of Liquids (Foods)

In their product literature, United Air Specialists, Inc. (UASI) describe a patented electrostatic method for spray coating articles, including foods, with liquids. They mention that resistivity may be reduced chemically by adding conductive fluids to highly-resistive liquids to make them suitable for spraying, but have not developed this concept with respect to foods, except to spray vegetable oils on molds to facilitate product release. Their patent (Wichmann and Henry, U.S. Pat. No. 5,209,410) is limited to a nozzle design suitable for spraying liquids, but does not describe specific uses for the device, much less in the application of seasonings to foods.

Pannell (*Confectionery Manufacture and Marketing* 17(6), 7–8 (1980)) describes in some detail a process for electrostatically coating snack foods with solids. In a single sentence, with no supporting information, he extends the method to the application of oil and oil-soluble flavor mixtures. Gorton (Baking and Snack 45–46,48 (August 1993)) mentions that electrostatic systems for applying fluids to food have been developed (no references). Vincent and Shepherd (UK Patent Application 2,177,585A) describe an apparatus and method for coating food or similar products using a stream of charged coating material from an electrostatic sprayer. The patent discloses the use of solid coating materials in great detail, but also states that the coating material may be in the form of a liquid or emulsion, provided only that it can be atomized. No details on how that might possibly be accomplished are given.

In our searches, we have turned up the following additional U.S. patents:

U.S. Pat. No. 4,925,699, Fagan, who forms a film of cooking oil on a pan surface by electrostatic deposition, wherein the cooking oil is readily ionizable or wherein the cooking oil is heated and mixed with sodium chloride for adjusting the viscosity and for increasing conductivity of the oil.

U.S. Pat. No. 3,941,910, Asano et al., wherein a metal sheet is coated with a surface coating oil which comprises diisodecyl phthalate and a fatty acid having a carbon number of 14–18. The coating may be applied by electrostatic spray coating or by emulsion coating.

U.S. Pat. No. 3,608,821, Simm and Koch, wherein coloring liquids are electrostatically atomized, the procedure including providing an ambient atmosphere around the atomizing electrode of an electric field with gasses and vapors including short-chained aliphatic compounds containing halogens and inorganic halogens. The process is useful for electrophotographic image development using suitable dye solutions and dispersions of high conductivity.

U.S. Pat. No. 2,764,508, Feick, which discloses electrostatic lubrication of metallic strips and the like.

U.S. Pat. No. 2,762.331, Henderson, which discloses oil spray devices for electrostatic oiling machines for the manufacture of electrolytic tin plate or the like, and U.S. Pat. No. 2,685,536, Starkey et al., which discloses a method for electrostatically coating articles, for example, a moving sheet of paper or the like.

Problems to be Solved

Coating edible food substrates, e.g., snack foods, with flavorings (i.e., seasonings), colorants, and stabilizers, e.g., antioxidants, remains a difficult challenge for snack food producers. Traditional methods of coating have a number of shortcomings.

More than one step can be required. Often a bonding agent, oil or water, must be applied prior to the addition of solid seasoning. The addition of oil contradicts the market need for minimal fat application. Not many food items can tolerate added water.

The adhesion of solid seasoning to snack food is often poor, even if a two-step approach is taken. This results in wasted seasoning and increased costs to the consumer. A 10% loss of the expensive seasoning mixture is typical.

Uneven application of the flavor and color ingredients to the product often result.

Chapman (Snack World, 37–39 (August 1992)) describes these problems and the extent to which snack manufacturers must go to produce quality products.

Special Problems Associated with Solid Seasonings

The use of electrostatic procedure to coat substrates with solid seasoning mixtures addresses many of the adhesion and some of the uneven coverage problems associated with more conventional seasoning application methods, but the practice of this art is still encumbered by a number of problems. Particles injected into the corona of a highly-charged electrode will have different sizes. The size of the particle will have an effect on the particle trajectory and will result in some segregation of the particles by size. This in turn leads to uneven coverage.

Another issue is one of solids transport and handling. The seasoning mixture must still be delivered and fed to the electrostatic coater by mechanical equipment of some kind and is subject to typical solids handling difficulties, such as clumping and dusting. Clumping is the caking or agglomeration of materials into larger particles and has an effect on the way the seasoning flows. It exacerbates the problem of uneven application of flavorings and leads to gumming up of machinery, requiring unproductive and expensive shutdowns for cleanup. Since clumping is often related to ambient relative humidity, formulations containing anti-caking agents should be tailored to the application environment. At many locations, where seasonal changes in relative humidity are common, formulators often have to provide adjustments of seasoning/anti-caking agent mixtures several times a year. A problem opposite to clumping is dusting, the loss of fine particles into the air. Dusting, like clumping, reduces yield and causes cleanup and safety concerns. A wide variety of seasoning mixtures are in use, each with different transport properties. This variability in handling needs has resulted in the commercial availability of over 500 different types of feeders.

Special Problems Associated with Application of Liquids

Liquid flavorings or seasonings have also been used to flavor snack foods. Snacks have been dipped into baths containing solutions of seasonings in a liquid carrier such as water or oil. This method is not widely used, since the dipping process can have adverse effects on the snack itself. Oil or water-based solutions of flavoring agents have also been sprayed on snack foods using conventional hydraulic technology. It is difficult to coat products uniformly with this method. The control of mist in the application area is also a significant problem.

Electrostatic application of a liquid flavoring, coloring, or stabilizing agent would have significant benefits over current food coating methods, but presents difficult challenges. A key factor for the successful application of this technology is control of the resistivity of the liquid being applied. Problems occur if the resistivity is either too low or too high. When extremely high, the liquid will not atomize. At the high end of the sprayable resistivity range, atomization is incomplete. Larger, non-atomized droplets form and drip from the electrode causing uneven coating problems. When the resistivity is too low, problems of arcing become a concern. For any given application of flavor, color, or stabilizing agent, the ability to adjust and control the resistivity will allow an optimal coating process to be run. Our invention provides the possibility of just such adjustment and control. If too high, the problem is resolved by addition of a selected resistivity modifier and/or increasing the temperature and/or voltage; if too low, the problem is resolved by addition of more base material, bearing in mind that economic efficiency and relative facility of deposition is greatest at the lower end of the resistivity range. Moreover, the control of the voltage utilized using the particular apparatus employed will be well within the skill of one skilled in the art, which voltage will at all times be less than that voltage which gives rise to the ionization of air.

In practice the flavoring, coloring, stabilizing, and incidental additives cannot be applied in concentrated form, but must be diluted in a carrier, such as a vegetable oil or fluid fat base material. Vegetable oils and fluid fats are not suitable for electrostatic atomization and spraying because of their very high electrical resistivities. This disclosure describes our solution to the problem of adjusting the resistivity of such an oil or oil-like carrier containing the desired flavoring, coloring, stabilizing, and other additaments to within a range suitable for electrostatic atomization and application.

From the foregoing, it is apparent that, although much progress has been made in the art, there is presently no suitable and readily available edible liquid flavoring, coloring, or stabilizing composition for electrostatic charging and deposition upon an edible food substrate, any method for arriving at or effecting the same or for producing such a treated or coated edible food product, such a food product itself, or a method for adjusting and controlling the resistivity of an edible base material oil or fluid fat using a flavoring, coloring, or stabilizing agent, optionally together with a diluent, so as to make it electrostatically chargeable and depositable upon an edible food substrate, much less wherein all of the essential ingredients of the composition are themselves edible and ingestible. It is accordingly an objective of the present invention and application to fulfill the need of the food industry for such previously-unavailable methods and materials and to instruct how the same may be provided and accomplished.

The present application describes such highly-desirable compositions and the manner in which such electrostatically chargeable and depositable liquid flavoring, coloring, and stabilizing compositions can be arrived at, provided, and applied uniformly and controllably to edible food substrates such as snack foods and related items. It provides food, and especially snack food, manufacturers with a method and composition for avoiding the problems previously encountered when using either solid or liquid seasonings. Other advantages of this invention will become apparent hereinafter.

OBJECTS OF THE INVENTION

It is an object of the present invention to instruct how to provide an edible liquid flavoring, coloring, or stabilizing composition which is suitable for electrostatic charging and deposition upon an edible food substrate for the treatment or coating thereof, a method for the electrostatic deposition of such a composition upon an edible food substrate, the coated or treated edible food substrate itself, and a method for the adjustment and control of the resistivity of an edible oil or fluid fat base material using edible flavoring or seasoning, coloring, and stabilizing agents, and if necessary also organic diluents, as resistivity-modifying additaments to bring the final composition within the necessary range of resistivity so as to enable the other objectives of the present invention to be carried out and effected, in each case wherein all of the essential ingredients are themselves edible and ingestible. Additional objects of the present invention will become apparent hereinafter and still other objects will be obvious to one skilled in the art to which the present invention pertains.

SUMMARY OF THE INVENTION

What we believe to be our invention, then, inter alia, comprises the following, singly or in combination:

A method for the adjustment and control of the resistivity of an edible base material selected from oils and fluid fats, to provide a liquid composition suitable for electrostatic charging and deposition of an edible flavoring agent, coloring agent, or stabilizing agent upon an edible food substrate at the temperature employed, comprising the steps of: admixing with the said base material one or more edible resistivity modifiers; selecting said edible resistivity modifiers from the group consisting of edible food-grade organic flavoring agents, coloring agents, stabilizing agents, and organic diluents; and including in said liquid composition at least one edible organic flavoring agent, coloring agent, or stabilizing agent whether or not it is a resistivity modifier; and such

- a method for the production of a coated or treated edible food substrate involving the adjustment and control of the resistivity of an edible base material selected from oils and fluid fats, to provide a liquid composition suitable for electrostatic charging and deposition upon an edible food substrate at the temperature employed, comprising the steps of: admixing with the edible base material one or more edible resistivity modifiers; selecting said edible resistivity modifiers from the group consisting of edible food-grade organic flavoring agents, coloring agents, stabilizing agents, and organic diluents; including in said liquid composition at least one edible organic flavoring agent, coloring agent, or stabilizing agent whether or not it is a resistivity modifier; and then electrostatically depositing the liquid composition upon an edible food substrate; such
- a method wherein the resistivity modifiers are selected from flavoring agents, coloring agents, and stabilizing agents; and
- a solid edible food substrate electrostatically coated or treated with an edible liquid composition produced by such a method.

Also, such

- a method wherein the organic diluent is selected from GRAS foodstuff ingredients; such
- a method wherein the organic diluent is selected from the group consisting of propylene glycol, polyethylene glycol, glycerine and benzyl alcohol; such
- a method wherein the base material is selected from the group consisting of vegetable oils, fish oils, and a liquified or melted animal fat or shortening; such
- a method wherein the base material is selected from the group consisting of soy oil, almond oil, peanut oil, cottonseed oil, canola oil, palm oil, olive oil, rice grain oil, corn oil, safflower oil; lard, tallow, mutton fat, beef fat, turkey fat, chicken fat, or pork fat; menhaden oil, herring oil, sardine oil, or cod oil; such
- a method wherein the edible food substrate treated or coated is selected from the group consisting of potato or corn chips, crackers, cookies, dry foods, nuts, cereals, grains, dry pet foods, and animal feeds; such
- a method wherein a flavoring, coloring, or stabilizing agent, selected from the group consisting of char oil, onion oil, garlic oil, butter flavoring, cheese flavoring, black pepper oil, oleoresin cumin, oleoresin cardamon, oleoresin ginger, annatto extract, ascorbic acid, rosemary extract, sage extract, or another Labiatae natural antioxidant extract, is included in the liquid composition; such
- a method wherein a flavoring, coloring, or stabilizing agent, selected from the group consisting of capsicum oleoresin, paprika oleoresin, carrot oleoresin, chlorophyll, and phosphate, is included in the liquid composition; such a method wherein the base material comprises a vegetable oil; such a method wherein the base material comprises soy oil and a selected resistivity modifier is oleoresin paprika or oleoresin capsicum; such a method wherein the percentage of all flavoring, coloring, and stabilizing agents included in the liquid composition is between about 0.2 and 20% by weight, such a method wherein the percentage of all flavoring, coloring, and stabilizing agents included in the liquid composition is at least about 3% by weight; such a method wherein the composition is applied to both top and bottom surfaces of the edible food substrate simultaneously; such a method wherein the composition is applied sequentially to the top and bottom surfaces of the edible food substrate; and such a method wherein, after the coating of the edible food substrate, one or more solid edible coating materials are applied to the edible food substrate.

Moreover, a method comprising the step of electrostatically depositing upon an edible food substrate an edible liquid composition, suitable for electrostatic deposition upon an edible food substrate to impart flavoring, coloring, or stability thereto, having a resistivity in a range permitting electrostatic charging and deposition thereof at the temperature employed, consisting essentially of:

(I) a food-grade edible base material selected from oil and fluid fat, which itself has a resistivity higher than the maximum of the range permitting electrostatic charging and deposition and which is therefore not per se electrostatically chargeable and depositable, and (II) one or more edible food-grade organic additaments selected from the group consisting of (a) a flavoring agent, and (b) a coloring agent, (c) a stabilizing agent, (d) an organic diluent, said additaments (II) being dissolved, emulsified, or dispersed in said base material (I), the relative amounts of (I) and (II) being sufficient to bring the resistivity of the liquid composition within a range permitting charging and deposition of said liquid composition on said edible food substrate at the temperature employed, (III) at least one additament being selected from the group consisting of (a), (b), and (c), which itself has a resistivity less than the maximum of the range permitting electrostatic charging and deposition; and a solid edible food substrate electrostatically coated or treated with an edible liquid composition according to such a method.

Also, a solid edible food substrate electrostatically-coated or treated with an edible liquid composition, suitable for electrostatic deposition upon an edible food substrate to impart flavoring, coloring, or stability thereto, having a resistivity in a range permitting electrostatic charging and deposition thereof at the temperature employed, consisting essentially of:

(I) a food-grade edible base material selected from oil and fluid fat, which itself has a resistivity higher than the maximum of the range permitting electrostatic charging and deposition and which is therefore not per se electrostatically chargeable and depositable, and (II) one or more edible food-grade organic additaments selected from the group consisting of (a) a flavoring agent, (b) a coloring agent, (c) a stabilizing agent, and (d) an organic diluent, said additaments (II) being dissolved, emulsified, or dispersed in said base material (I), the relative amounts of (I) and (II) being sufficient to bring the resistivity of the liquid composition within a range permitting charging and deposition of said liquid composition on said edible food substrate at the temperature employed, (III) at least one additament being selected from the group consisting of (a), (b), and (c), which itself has a resistivity less than the maximum of the range permitting electrostatic charging and deposition; such comprise lecithin; such a food substrate wherein the organic diluent is selected from GRAS foodstuff ingredients; such a food substrate wherein the organic diluent is selected from the group consisting of propylene glycol, polyethylene glycol, glycerine and benzyl alcohol; such a food substrate wherein the base material is selected from the group consisting of vegetable oils, fish oils, and a liquified or melted animal fat or shortening; such a food substrate wherein the base material is selected from the group consisting of soy oil, almond oil, peanut oil, cottonseed oil, canola oil, palm oil, olive oil, rice grain oil, corn oil, safflower oil; lard, tallow, mutton fat, beef fat, turkey fat, chicken fat, or pork fat; menhaden oil, herring oil, sardine oil, or cod oil; such a food substrate wherein the edible food substrate treated or coated is selected from the group consisting of potato or corn chips, crackers, cookies, dry foods, nuts, cereals, grains, dry pet foods, and animal feeds; such a food substrate wherein the liquid composition contains a flavoring, coloring, or stabilizing agent (II) selected from the group consisting of char oil, onion oil, garlic oil, butter flavoring, cheese flavoring, black pepper oil, oleoresin cumin, oleoresin cardamon, oleo-resin ginger, annatto extract, ascorbic acid, rosemary extract, sage extract, or another Labiatae natural antioxidant extract; such a food substrate wherein the liquid composition contains a flavoring, coloring, or stabilizing agent (II) selected from the group consisting of capsicum oleoresin, paprika oleoresin, carrot oleoresin, chlorophyll, and phosphate; such a food substrate wherein the base material (I) comprises a vegetable oil; such a food substrate wherein the base material (I) comprises soy oil; such a food substrate wherein the percentage of all (a), (b), and (c) additaments in the liquid composition is between about 0.2 and 20% by weight; and such a food substrate wherein the percentage of all (a), (b), and (c) additaments in the liquid composition is at least about 3% by weight.

GENERAL DESCRIPTION OF THE INVENTION

The present invention provides a method for treating or coating edible food substrates in a uniform and controlled manner with an edible liquid composition to impart flavor, color, enhanced stability toward rancidity or color changes, or any combination of flavor, color, and enhanced stability to the food substrates, wherein the method employed for effecting the same is an electrostatic process whereby the edible liquid composition is electrostatically charged to atomize and form droplets of the liquid and whereby the charge causes the droplets of the liquid to be accelerated toward and attracted to the edible food substrate, which is in contact with electrical ground or held between the electrically charged droplets and the electrical ground, thereby to coat the edible food substrate in a uniform manner. The product of the invention, the thustreated or coated edible food substrate, is also an integral part of the present invention, as is the method of adjusting and controlling the resistivity of the edible liquid composition so as to make the final composition suitable for the aforesaid electrostatic charging and deposition upon the edible food substrate, by the addition of one or more resistivity modifiers, all of the essential ingredients in the composition, the method, and the treated or coated edible food products being themselves edible and ingestible.

The percentage by weight of all of flavor, color, and stabilizing additaments (a), (b), and (c) in the liquid composition for electrostatic deposition is usually between about 0.2 and 20 percent by weight, and preferably at least about three (3) percent by weight of the total liquid composition. When the percentage by weight of (a), (b), and (c) additaments in the liquid composition is less than 0.2 percent by weight, there is generally insufficient flavor, color, or stability imparted to the food substrate treated or coated and, when the total amount of additaments (a), (b), and (c) in the liquid composition electro-statically deposited upon the food substrate is in excess of about twenty (20) percent by weight, the expense becomes exorbitant and the flavoring, coloring, or stabilizing agent deposited is generally in excess of an amount necessary or suitable for imparting a desired flavor, color, or stability to the coated or treated food substrate. Accordingly, total amounts of additaments (a), (b), and (c) within the stated ranges represent the optimum from the standpoint of maximum efficiency and attainment of the desired objective of providing a satisfactory flavor, color, and stability to the coated or treated food substrate.

The resistivity of the modified edible liquid composition for electrostatic charging and deposition should generally be between about 0.05 and 300 megaohm-centimeters and preferably between about one (1) and 150 megaohm-centimeters, usually employing a voltage between about 40 and 300, preferably between about 80 and 120 kilovolts (kV).

Basic Edible Fluid or Liquid Composition:

The edible liquid base material utilized according to the present invention may be a food-grade vegetable oil, a liquified or melted animal fat or shortening, a fish oil, a modified fat, a hydrogenated or partially hydrogenated vegetable oil or animal fat, or the like. Such edible fluids or liquids may be, for example, one or more of the following: vegetable (including nut) oils such as soy oil, peanut oil, almond oil, cottonseed oil, canola oil, palm oil, corn oil, olive oil, rice grain oil, safflower oil, and the like; fats such as lard, tallow, mutton fat, beef fat, turkey fat, chicken fat, pork fat, and the like; fish oils such as RBD (refined, bleached, and deodorized) menhaden oil, herring oil, sardine oil, cod oil and the like. These are generically referred to herein as oil and fluid fat base materials. Temperature elevation may be required for those not fluid at room temperature.

Such edible liquid base materials by themselves are not characterized by a suitable resistivity for electrostatic charging and deposition, and the addition thereto of certain soluble, emulsifiable, or dispersible flavoring or seasoning, coloring, or stabilizing agents, and if necessary also a diluent, reduces the resistivity thereof into a suitable range for electrostatic charging and deposition.

For example, flavoring agents such as char oil, onion oil, garlic oil, butter flavoring, cheese flavoring, black pepper oil, oleoresin cardamon, oleoresin cumin, oleoresin ginger, other essential oils and the like, coloring agents such as annatto extract, FD&C colors, and the like, and other additives such as antioxidants including BHA(butylated hydroxyanisde), BHT(butylated hydroxytoluene), TBHQ (text-butylhydroquinone), rosemary extract, sage extract, and other natural antioxidants of the Labiatae genus, do not themselves possess resistivities in a range suitable for electrostatic application and thus, by themselves or when added to the edible liquid base material, do not by themselves bring the resistivity of the edible liquid base material into a suitable range for electrostatic charging and deposition. They may still be used, however.

It has been found that resistivity modifiers which are also edible and ingestible may be employed to reduce the resistivity of the edible liquid base material, with or without addition of other flavoring or seasoning, coloring, stabilizing or diluents which do not themselves bring the liquid base material into a suitable resistivity range for electrostatic charging and deposition, and such effective resistivity modifiers may representatively be one or more of the following materials: spice extracts such as oleoresin capsicum, certain other flavoring agents, both natural and synthetic, food coloring agents both natural and synthetic such as oleoresin paprika, oleoresin carrot, and chlorophyll; antioxidants such as phosphates; and diluents, especially GRAS diluents, such as propylene glycol, benzyl alcohol, and polyethylene glycol (PEG).

Edible foods which may be treated or coated according to the method of the invention include, without limitation, snack foods such as potato or corn chips, crackers, cookies, dried foods, nuts, cereals, grains, dry pet foods, animal feeds, and the like.

According to the present invention, suitable electrostatic charging and deposition apparatus usually involves an electrode, which comes in contact with the basic liquid composition, charged at a voltage which should be within a suitable range, e.g., normally at least about 40 kV, usually 40–300 kV, preferably about 80–120 kV, but in any event less than that which would cause electrical discharge in the working atmosphere, and the apparatus employed is preferably such that the potential can be adjusted within the stated range to effect optimum coating performance.

According to the present invention, the edible food product may be coated with the liquid composition of the invention by electrostatic deposition on both surfaces at once, or on the top and bottom surfaces sequentially, and in any event with minimization of handling and abuse of the edible food product treated or coated, and may if desired be followed, preferably before complete drying, by a further step of coating with fine particulate edible solid material in any desired manner. One particular advantage of the present invention is that it can be employed to apply food-grade antioxidants to edible food products such as raisins or nuts, e.g., almonds, or the like to act as stabilizers and moisture barriers and thus to improve stability and shelf life of the edible food substrate treated.

The Resistivity Modifier

A major aspect of the present invention is the modification of the electrostatic properties of vegetable oils and related base materials using food-grade additives or additaments (flavors, colors, stabilizers, and diluents) such that the resulting ultimate total composition can be applied using electrostatic means and procedure. Vegetable oils and fats are not readily applied by electrostatic means because they are highly electrically resistive fluids (resistivity>500 megaohm-cm). We have found, however, that certain spice extracts and other food-grade additives can be added to vegetable oils or fluid fats in order to make the resulting compositions suitable for electrostatic application. These additives function in several ways.

1. The resistivity modifiers lower the electrical resistivity of the base material, and hence of the liquid composition, into the range 0.05–300 megaohm-cm, where electrostatic spraying becomes practical.
2. Some are components of seasonings which serve the dual purpose of adding desirable flavoring to the food substrate as well as modifying the resistivity of the liquid base material.
3. Some are components of food coloring agents which serve the dual purpose of adding desirable colorings to the food substrate as well as modifying the base material resistivity.
4. Some are stabilizing agents which serve the dual purpose of stabilizing the composition (as is the case with additives such as antioxidants) as well as modifying the base material resistivity.
5. Diluents also dilute.

It has thus been found that certain edible flavorings or seasonings, colorings, stabilizers, and diluents are effective resistivity modifiers from the standpoint of reducing the resistivity of the edible oil or fat base material so as to bring the total composition within a resistivity range which is suitable for electrostatic charging and deposition upon the edible food substrate.

The effect of such flavorings or seasonings, colorings, stabilizers, and diluents is shown in the following Tables.

Our findings are surprising in that only certain of such edible additaments, e.g., certain spice extracts, show effective resistivity-modifying behavior. This is illustrated in Table 1, which shows the resistivity of a number of soy oil—spice extract mixtures (oleoresins, extracts, and essential oils) at various concentrations. When this is the case, i.e., when the resistivity-modifying activity of the flavoring or coloring or stabilizing agent by itself is non-existent or insufficient to permit electrostatic charging and deposition of the resulting composition, the addition of a resistivity-modifying amount of an edible diluent is required.

Partial Glossary of Terms and Identification of Commercial Ingredients Employed

1. Vegetone®, a registered trademark of KALSEC, Inc.:

Blends of annatto and/or turmeric and/or paprika.

Blends containing paprika reduce the resistivity of a base material oil or fluid fat system and are therefore “resistivity modifiers”.

2. Herbalox®O, a registered trademark of KALSEC, Inc.:

Rosemary extract—minor amount w/w

Vegetable oil—major amount w/w

This is not a resistivity modifier.

3. Herbalox®P, a registered trademark of KALSEC, Inc.:

Rosemary extract—minor amount w/w

Vegetable oil—major amount w/w

Polysorbate 80® remainder

This is a resistivity modifier.

4. Herbalox®W, a registered trademark of KALSEC, Inc.:

Herbalox®O—major amount w/w

Hydroxylated lecithin—minor amount w/w

Panodan—minor amount w/w

This is a resistivity modifier.

5. Panodan®, diacetyltartaric acid esters of monoglycerides, from Grinsted Products.

This is a resistivity modifier.

6. Ascorbalox® Type A, a registered trademark of KALSEC, Inc.:

Herbalox®O—minor amount w/w

Ascorbic acid <38 microns on largest dimension-minor amount w/w

Vegetable oil—major amount w/w

This is not a resistivity modifier.

7. Aquaresin® Barbeque Spice, a registered trademark of KALSEC, Inc.:

Char oil hickory smoke flavoring—minor amount w/w

Herbalox®O—minor amount w/w

Panodan®—minor amount w/w

Centrolene®—remainder

Plus minor w/w percentages of one or more of the following: OR (oleoresin) Black Pepper, OR Ginger, OR Nutmeg, OR Clove, OR Capsicum, OR Cinnamon, Oil of Black Pepper, Aquaresin® Onion (OR or oil of onion in vegetable oil), Aquaresin® Garlic (OR or oil of garlic in vegetable oil).

This is a resistivity modifier.

8. Centrolene®, hydroxylated lecithin from Central Soya.

This is a resistivity modifier.

9. Durabrite®, a registered trademark of KALSEC, Inc.:

Oleoresin Paprika—major amount w/w

Ascorbalox® Type A—minor amount w/w

This is a resistivity modifier.

TABLE 1

Resistivity of Soy Oil Solutions of Various Spice Extracts.

| Spice Extract | Concentration of Spice Ext. In Soy Oil (% w/w) | Resistivity (megaohm-cm) |
|---|---|---|
| Paprika Oleoresin | 1 | 500 |
| Paprika Oleoresin | 3 | 200 |
| Paprika Oleoresin | 5 | 150 |
| Paprika Oleoresin | 7 | 50 |
| Paprika Oleoresin | 10 | 35 |
| Carrot Oleoresin | 10 | 15 |
| Aquaresin ® Barbeque[1] | 1 | 500 |
| Aquaresin ® Barbeque | 10 | 0.5 to 2 |
| Annatto | 100 | 500 |
| Black Pepper | 10 | 300 |
| Black Pepper | 100 | 3.5 |
| Capsicum oleoresin (OR) | 100 | 4 |
| Capsicum oleoresin (OR) | 10 | 150 |
| Cardamom | 100 | 1 |
| Dill Oil | 10 | 500 |
| Dill Oil | 100 | 0.5 |
| Oil of Black Pepper | 100 | 500 |
| Oil of Clove | 10 | 500 |
| Oil of Clove | 100 | 0.7 |
| Oil of Fennel | 100 | 70 |
| Oil of Garlic | 10 | 500 |
| Oil of Garlic | 100 | 1.5 |
| Oil of Nutmeg | 100 | 500 |
| Oil of Spearmint | 100 | 0.2 |

[1]Aquaresin ® is a registered trademark of Kalsec, Inc.

Reasonably low concentrations of paprika, capsicum and carrot oleoresins and barbeque Aquaresin® BBQ show a dramatic ability to lower the resistivity of soy oil into the desired resistivity range (0.05–300 megaohm-cm). Three to ten percent oleoresin paprika in soy oil, for example, gives resistivity readings on the order of 35–200 megaohm-cm. We have accordingly successfully coated corn chips with an oleoresin paprika—soy oil mixture using commercial electrostatic equipment.

Some of the materials examined have been shown to be ineffective resistivity modifiers. Those materials whose neat (concentration=100%) measured resistivities are above 500 megaohm-cm have no promise as resistivity modifiers. Other materials, such as black pepper and cardamon oleoresins, whose neat resistivities are fairly low (e.g. 3.5 megaohm-cm for black pepper) are not useful at reasonable concentrations. A ten percent solution of black pepper oleoresin in soy oil has a resistivity of 300 megaohm-cm and is near the upper limit for electrostatic atomization and spraying. The essential oils listed in Table 1 are also ineffective resistivity modifiers at typical usage levels.

We have also found that other food-grade ingredients can be added to vegetable oils or fluid fat to modify their electrical resistivity. This is important, because these additives, e.g., diluents, can be used to modify the resistivity of oil solutions containing spice extracts (flavoring or coloring agents) or antioxidants, such as Labiatae antioxidants or micronized ascorbic acid, which do not in themselves sufficiently modify the resistivity of the oil. Some examples of the effects of such food additives are shown in Table 2.

TABLE 2

Resistivity of Soy Oil Solutions of Food-grade Additives.

| Additive | Concentration of Additive in Soy Oil (% w/w) | Resistivity (megaohm-cm) |
|---|---|---|
| Glacial Acetic Acid | 5 | 500 |
| Alfol ® 12[2] | 10 | 500 |
| Alfol ® 12 | 50 | 175 |
| Alfol ® 12 | 100 | 2.5 |
| Benzyl alcohol | 5 | 500 |
| Benzyl alcohol | 20 | 400 |
| Benzyl alcohol | 100 | 0.1 |
| Centrolene ® [3] | 0.1 | 300 |
| Centrolene ® | 0.5 | 40 |
| Centrolene ® | 1 | 35 |
| Glycerine | 100 | 0.1 |
| Glyceryl monooleate | 10 | 200 |
| Glyceryl monooleate | 100 | 2 |
| lecithin | 0.1 | 400 |
| lecithin | 0.25 | 300 |
| lecithin | 0.5 | 40 |
| lecithin | 1 | 50 |
| lecithin | 2 | 20 |
| Monosodium glutamate | 10 | 500 |
| Myvacet ® 9-45[4] | 100 | 500 |
| Myvacet ® 5-07 | 100 | 5 |
| Myvacet ® 5-07 | 10 | 500 |
| Panodan ® [5] | 5 | 500 |
| Panodan ® | 10 | 175 |
| Panodan ® | 15 | 40 |
| Panodan ® | 20 | 20 |
| Panodan ® | 30 | 25 |
| Panodan ® | 40 | 35 |
| Panodan ® | 50 | 15 |
| Panodan ® | 100 | 150 |
| Polysorbate-80 ® | 1 | 500 |
| Polysorbate-80 | 2.5 | 500 |
| Polysorbate-80 | 5 | 10 to 100 |
| Polysorbate-80 | 10 | 2 to 40 |
| Polysorbate-80 | 100 | 0.04 |
| polyethylene glycol | 10 | 2 to 100 |

TABLE 2-continued

Resistivity of Soy Oil Solutions of Food-grade Additives.

| Additive | Concentration of Additive in Soy Oil (% w/w) | Resistivity (megaohm-cm) |
|---|---|---|
| polyethylene glycol | 100 | 0.05 |
| propylene glycol | 100 | 0.3 |
| Tocopherols, mixed | 100 | 500 |
| Tea catechins | 1 | 500 |
| Santone ® 8-1-0[6] | 5 | 3 to 10 |
| Tenox ® GT-2[7] | 100 | 500 |
| Triacetin | 10 | 500 |
| Triacetin | 100 | 10 |
| Nathin ® 140[8] | 0.5 | 45 |
| Nathin ® 5F | 0.5 | 140 |
| Nathin ® 3KE | 0.5 | 35 |

[2]Alfol ® is a registered trademark of Vista Chemical Co. Alfol 12 is dodecanol.
[3]Centrolene ® is a registered trademark of Central Soya Company, Inc. for a hydroxylated lecithin product.
[4]Myvacet ® is a registered trademark of Eastman Chemical Products Inc. and consists of acetoglycerides from hydrogenated cottonseed oils.
[5]Panodan ® is a registered trademark of Grinsted Products and consists of diacetyl tartaric acid esters of monoglycerides.
[6]Santone ® is a registered trademark of Durkee Industrial Foods Group/SCM Corp. and consists of polyglycerol esters of fatty acids.
[7]Tenox ® is a registered trademark of Eastman Chemical Products Inc. for a family of antioxidants. Tenox ® GT is a tocopherol-based material.
[8]Nathin ® is a registered trademark of Central Soya Company, Inc. and is the brand name for a series of refined lecithin products.

Table 2 also contains some surprising results. Very polar compounds such as glacial acetic acid would be expected to show dramatic resistivity-lowering effects for soy oil, but this is not the case. The effect of 5% glacial acetic acid is comparable to the very much less polar long chain alcohol Alfol® 12 (dodecanol) or benzyl alcohol.

We have found that temperature can be used to fine-tune the resistivity of the oil/additive or additament mixture (additive or additament meaning, e.g., flavoring or seasoning, coloring, stabilizing (e.g. antioxidant), diluent, or mixtures thereof). For liquids, as the temperature increases, the resistivity generally decreases. This inverse relationship is shown in the data in Table 3. It goes without saying that the temperature should not be so high as to cause deterioration of the selected base material or final composition.

TABLE 3

Effect of temperature on the resistivity of lecithin/soy oil mixtures at different concentrations. Resistivity (megaohm-cm)

| Temperature (deg. C.) | Concentration of Lecithin 0.25% | 0.50% | 1.0% |
|---|---|---|---|
| 11 | — | 200 | — |
| 12 | 350 | — | — |
| 15 | — | — | 90 |
| 20 | 300 | 160 | — |
| 24 | — | — | 75 |
| 25 | — | 145 | — |
| 30 | 225 | 125 | — |
| 35 | — | 100 | 50 |
| 40 | 150 | 75 | 40 |
| 45 | 125 | — | — |
| 47 | — | 60 | — |
| 50 | 100 | — | — |
| 52 | — | 45 | 22 |

TABLE 3-continued

Effect of temperature on the resistivity of lecithin/soy oil mixtures at different concentrations.
Resistivity (megaohm-cm)

| Temperature (deg. C.) | Concentration of Lecithin | | |
|---|---|---|---|
| | 0.25% | 0.50% | 1.0% |
| 57 | — | 35 | — |
| 60 | 70 | — | — |
| 63 | — | 30 | 15 |
| 70 | — | 22 | 12 |
| 78 | 35 | — | — |
| 80 | — | 16 | 8 |
| 82 | 30 | — | — |
| 89 | — | 12 | 6.5 |

A 0.25% lecithin solution at 20 deg. C. has a resistivity of about 300 megaohm-cm. By increasing the temperature to 82 deg. C., the resistivity is reduced by an order of magnitude and the solution changes from a non-sprayable material to one which is much more readily atomized and sprayed electrostatically.

Other base material oils and fats behave similarly to soy oil. They have high initial resistivities and the resistivities can be modified using the same additives and temperature variations which work as resistivity modifiers for soy oil.

TABLE 4

Menhaden Oil (Refined)
The menhaden oil was obtained from Zapata Haynie Corporation and is a RBD-D Code #548 SPMOtm Brand Menhaden Oil lot #050793

| Sample | T° C. | Resistivity (R) (megaohms-cm) |
|---|---|---|
| control | 30 | 500+ |
| control | 35 | 500+ |
| 5% Aquaresin ® Barbecue Spice | 15 | 65 |
| 5% Aquaresin ® Barbecue Spice | 30 | 30 |
| 5% Aquaresin ® Barbecue Spice | 35 | 25 |
| 1% Centrolene ® | 20 | 70 |
| 1% Centrolene ® | 35 | 35 |

TABLE 5

More Soy Oil Data
The soy oil used in this evaluation was obtained from Central Soya. It is a 130 IV oil Code SO-4.

| Sample | T° C. | Resistivity (R) (megaohms-cm) |
|---|---|---|
| 1% Centrolene ® | 20 | 500+ |
| 1% Centrolene ® | 25 | 65 |
| 5% Herbalox ® Type P | 25 | 500+ |
| 5% Herbalox ® Type P | 30 | 500 |
| 5% Herbalox ® Type P | 35 | 500 |
| 5% Herbalox ® Type P | 40 | 450 |
| 5% Herbalox ® Type P | 45 | 400 |
| 5% Herbalox ® Type P | 50 | 300 |
| 5% Herbalox ® Type P | 55 | 200 |
| 10% Herbalox ® Type P | 30 | 10–75 |
| 10% Herbalox ® Type P | 35 | 7–50 |
| 5% Herbalox ® Type W | 25 | 40 |
| 1% Chlorophyll | 25 | 150 |

TABLE 5-continued

More Soy Oil Data
The soy oil used in this evaluation was obtained from Central Soya. It is a 130 IV oil Code SO-4.

| Sample | T° C. | Resistivity (R) (megaohms-cm) |
|---|---|---|
| 1% Chlorophyll | 30 | 125 |
| 1% Chlorophyll | 45 | 60 |
| 2.5% Chlorophyll | 35 | 22 |
| 2.5% Chlorophyll | 40 | 20 |
| 5% Chlorophyll | 30 | 30 |
| 5% Chlorophyll | 35 | 30 |
| 1% lecithin | 25 | 55 |
| 1% lecithin | 30 | 50 |
| 1% lecithin | 35 | 40 |
| 5% Aquaresin ® Barbecue Spice | 30 | 30 |
| 5% Aquaresin ® Barbecue Spice | 35 | 25 |
| 10% acetone-desludged paprika | 23 | 60 |
| 10% acetone-desludged paprika | 27 | 50 |
| 10% acetone-desludged paprika | 30 | 70 (2× acetone wash) |
| 10% acetone-desludged paprika | 34 | 40 |
| 10% acetone-desludged paprika | 45 | 30 |
| 10% acetone-desludged paprika | 51 | 20 |
| 10% paprika | 26 | 50 |
| 10% paprika | 30 | 50 |
| 10% paprika | 35 | 40 |
| 10% paprika | 45 | 25 |
| 10% GT-1 (5% tocopherol) | 45 | 500+ |
| 15% TKPP (antioxidant) | 30 | 250 |
| 24% TKPP | 30 | 70 |
| 24% TKPP | 35 | 60 |

The chlorophyll in the above Table was obtained from Chart Corporation Inc., Paterson, N.J., which is the U.S. distributor for Bush, Boake, Allen Ltd., London, England.

Three of the samples above contained tetrapotassium pyrophosphate (TKPP). The phosphate was pebble milled with Herbalox®O in hydrogenated soy oil, both samples, for 24 hours. The reduction in resistivity can be attributed to the phosphate.

The acetone-desludged paprika gave a resistivity almost identical to the non-desludged paprika, so the paprika resistivity is not due to the acetone-insoluble materials therein.

TABLE 6

Various Additional Base Material Oils and Fats

| Sample | T° C. | Resistivity (megaohm-cm) |
|---|---|---|
| Coconut Oil | 35 | 500+ |
| +0.25% lecithin | 35 | 200 |
| +0.25% lecithin | 45 | 140 |
| +0.25% lecithin | 55 | 80 |
| +10% paprika oleoresin | 35 | 30 |
| +10% paprika oleoresin | 45 | 20 |
| +10% paprika oleoresin | 55 | 15 |
| +10% carrot oleoresin | 30 | 15 |
| +5% carrot oleoresin | 35 | 15 |
| +5% carrot oleoresin | 45 | 10 |
| +10% Aquaresin ® Barbecue Spice | 30 | 10 |
| +10% Aquaresin ® Barbecue Spice | 45 | 5 |
| +3% desludged paprika oleoresin | 30 | 200 |

TABLE 6-continued

Various Additional Base Material Oils and Fats

| Sample | T° C. | Resistivity (megaohm-cm) |
| --- | --- | --- |
| +3% desludged paprika oleoresin | 45 | 140 |
| +3% desludged paprika oleoresin | 55 | 90 |

TABLE 7

| Sample | Temp. (Deg.C.) | Resistivity (megaohm-cm) |
| --- | --- | --- |
| Almond Oil | 25 | 500+ |
| +5% Paprika oleoresin | 30 | 150 |
| +5% Paprika oleoresin | 40 | 100 |
| +5% Aquaresin ® Barbeque Spice | 30 | 35 |
| +5% Aquaresin ® Barbeque Spice | 45 | 20 |
| +0.25% lecithin | 35 | 300 |
| +0.25% lecithin | 45 | 175 |
| +10% Vegetone ® Extra Yellow | 30 | 500+ |
| +10% Vegetone ® Extra Yellow | 40 | 500+ |

TABLE 8

| Sample | Temp. (Deg.C.) | Resistivity (megaohm-cm) |
| --- | --- | --- |
| Lard Melted | 50 | 500+ |
| 0.25% lecithin | 67 | 90 |
| 5% Paprika oleoresin | 51 | 45 |

DETAILED DESCRIPTION OF THE INVENTION

The following Examples are given by way of illustration only, and are not to be construed as limiting.

The following examples show that, by the selection of an appropriate food-grade edible base material selected from oil and fluid fat, which itself has a resistivity higher than the maximum of the range permitting electrostatic charging and deposition thereof at the temperature employed, and one or more edible organic additaments selected from the group consisting of food-grade flavorings and colorings and stabilizers, and if necessary one or more resistivity-modifying additaments selected from the group consisting of food-grade diluents, a final liquid flavoring, coloring, or stabilizing composition can readily be arrived at which has a resistivity which is suitable for electrostatic charging and deposition at the temperature employed, thereby to effect electrostatic deposition upon an edible food substrate for the purposes of flavoring, coloring, or adding stability thereto. In the selection of suitable ingredients and temperatures for the aforesaid purposes, reference to the Examples and the Tables hereof will be of assistance to one skilled in the art in arriving at a final composition which is suitable for the aforesaid intended purposes. Materials herein identified as Resistivity Modifiers reduce the resistivity of a fat or oil when dissolved or emulsified therein, as can be seen from the Examples and foregoing Tables of this application.

The selection process, as will be apparent to one skilled in the art, is simple. The starting liquid base material is selected. Its resistivity can be determined from the Tables hereof or by employing the "Procedure" set forth herein using an ohmmeter. At any rate, after selection of the starting liquid base material, which as usual will most likely have a resistivity unsuitable for charging and deposition, the selection of a suitable additament which is a flavoring, coloring, or stabilizer may then be made. Reference to the Tables and Examples hereof will show whether or not this material is a resistivity modifier. If it is a sufficient resistivity modifier to bring the total composition within a suitable resistivity range for electrostatic charging and deposition at the temperature intended to be employed, then the composition may be sufficient as so constructed. If the first additament, which is a flavoring, coloring, or stabilizing agent, is not a resistivity modifier or is not a sufficient resistivity modifier to bring the composition within a proper range for electrostatic charging and deposition, then additional additaments may be included in the composition which are resistivity modifiers and reference to the Tables and Examples hereof can of course be made to assist in the selection of such additional agents. In the event that only a single flavoring, coloring, or stabilizing agent is desired in the composition, or if a second or third or fourth flavoring or coloring or stabilizing agent is not a resistivity modifier or an insufficient resistivity modifier to bring the composition into the proper resistivity range for electrostatic charging and deposition, then one skilled in the art may select a suitable diluent for such purpose, all as clearly indicated by the Tables of this application and as illustratively set forth in the Examples hereof. Then, in the event diluent as selected is sufficient to bring the composition down into a proper resistivity range, but a higher resistivity would be suitable, the composition may be let down by the addition of further liquid base material. Conversely, in the event the composition of the fluid base material plus the selected flavoring, coloring, or stabilizing agent, and optionally diluent, is in concentrated form for shipment and further dilution within the desired resistivity range is considered advantageous, the composition may in such case be diluted with further diluent, so as to provide a more dilute composition which is suitable for the intended purpose of electrostatic charging and deposition. The latter situation is often the case when a concentrate is desired to be shipped and the said concentrate may advantageously be let down or simply diluted by the addition thereto of diluent, or by the addition of any other desired additament which is a resistivity modifier, to the extent necessary or desirable, as can readily be determined by one skilled in the art using the Tables and Examples of this application as well as the "Procedure" of this application, all of which is well within the skill of one skilled in the art without the exercise of inventive ingenuity, so long as the directions of this application are followed.

Procedure

A hand-cranked megaohmmeter, model AMC-4, obtained from Amprobe Instrument, Lynbrook, N.Y., with a resistance probe, part number 7922-00 obtained from Ransburg, Inc., Indianapolis, Ind., was used to measure resistivity. An ample amount of the substrate to be measured is placed in a water bath, and the sample slowly stirred to provide a uniform temperature within the sample. The probe and thermometer are immersed in the sample and resistivity and temperature are determined at the same time.

Electrostatic Deposition

Test samples are electrostatically applied to the edible food substrate, e.g., corn tortilla or potato chips, using a device developed by Electrostatic Coating Technologies, Inc. (ECTI) of East Windsor, Conn. It comprises an electrically-charged metal bar over which are arranged a series of cells to which fluid can be pumped. The fluid drips down the bar and is atomized when the bar is charged (40–300, preferably about 80–120 kV) and the resistivity of the fluid is in the proper range. Underneath the bar is a trolley mechanism for moving a wood-framed metal screen tray past the bar in a manner perpendicular thereto. Below the tray is an electrical ground. The edible food substrate, e.g., corn tortilla or potato chips, is placed on the tray and moved past the bar. The residence time may be varied to vary and control the amount of material electrostatically deposited upon the selected food substrate.

Other suitable apparatus which may be employed in the same manner includes: Totalstat® Electrostatic Spray System by United Air Specialists, Incorporated (UASI), Cincinnati, Ohio and Ransburg Electrostatic Coating Gun by Ransburg, Inc., Indianapolis, Ind., and the apparatus of UASI U.S. Pat. No. 5,209,410 and Ransburg U.S. Pat. No. 4,002,777.

TWO COMPONENT COMPOSITIONS

EXAMPLE 1

Soy oil is tested for resistivity according to the foregoing "Procedure" and is found to have a resistivity greater than 500 megaohm-cm and is unsuitable for electrostatic deposition. The oil is modified by incorporation therein of 5% (w/w) standardized oleoresin paprika (80,000 ASTA color units), which itself has a resistivity of 5 megaohm-cm.

The resulting solution has a resistivity of about 60 megaohm-cm and is suitable for electrostatic deposition upon food substrates such as potato or corn chips.

Upon electrostatic deposition upon chips in the manner set forth under "Electrostatic Deposition" hereinbefore, at a temperature of 100° F., a fine even paprika light orange coloring is imparted to the chips.

EXAMPLE 2

Corn oil is tested for resistivity according to the foregoing "Procedure" and is found to have a resistivity greater than 500 megaohm-cm and is unsuitable for electrostatic deposition. The oil is modified by incorporation therein of 2% (w/w) standardized oleoresin paprika (80,000 ASTA color units), which itself has a resistivity of 5 megaohm-cm.

The resulting solution has a resistivity of about 100 megaohm-cm and is suitable for electrostatic deposition upon food substrates such as crackers.

Upon electrostatic deposition upon crackers in the manner set forth under "Electrostatic Deposition" hereinbefore, at a temperature of 120° F., a fine even paprika light-orange coloring is imparted to the crackers.

EXAMPLE 3

Soy oil is tested for resistivity according to the foregoing "Procedure" and is found to have a resistivity greater than 500 megaohm-cm and is unsuitable for electrostatic deposition. The oil is modified by incorporation therein of 10% (w/w) standardized oleoresin capsicum (200,000 Scoville heat units), which itself has a resistivity of about 4 megaohm-cm.

The resulting solution has a resistivity of about 50 megaohm-cm and is suitable for electrostatic deposition upon food substrates such as potato or corn chips.

Upon electrostatic deposition upon chips in the manner set forth under "Electrostatic Deposition" hereinbefore, at a temperature of 100° F., a fine even hot spicy coating is imparted to the chips.

EXAMPLE 4

Sunflower oil is tested for resistivity according to the foregoing "Procedure" and is found to have a resistivity greater than 500 megaohm-cm and is unsuitable for electrostatic deposition. The oil is modified by incorporation therein of 5% (w/w) oleoresin carrot.

The resulting solution has a resistivity of 15 megaohm-cm and is suitable for electrostatic deposition upon food substrates such as potato or corn chips.

Upon electrostatic deposition upon chips in the manner set forth under "Electrostatic Deposition" hereinbefore, at a temperature of 90° F., a fine even carrot yellow coloring and flavoring is imparted to the chips.

THREE COMPONENT COMPOSITIONS

EXAMPLE 5

Cottonseed oil is tested for resistivity according to the foregoing "Procedure" and is found to have a resistivity greater than 500 megaohm-cm and is unsuitable for electrostatic deposition. The oil is modified by incorporation therein of 10% (w/w) standardized oleoresin paprika (80,000 ASTA color units), which itself has a resistivity of 5 megaohm-cm, and 5% (w/w) of oleoresin ginger.

The resulting solution has a resistivity of about 15 megaohm-cm and is suitable for electrostatic deposition upon food substrates such as potato or corn chips.

Upon electrostatic deposition upon chips in the manner set forth under "Electrostatic Deposition" hereinbefore, at a temperature of 90° F., a fine even ginger-flavored light-orange coating is imparted to the chips.

EXAMPLE 6

Soy oil is tested for resistivity according to the foregoing "Procedure" and is found to have a resistivity greater than 500 megaohm-cm and is unsuitable for electrostatic deposition. The oil is modified by incorporation therein of 15% (w/w) standardized oleoresin capsicum (200,000 Scoville heat units), which itself has a resistivity of 4 megaohm-cm, and 1% (w/w) of rosemary extract.

The resulting solution has a resistivity of about 40 megaohm-cm and is suitable for electrostatic deposition upon food substrates such as potato or corn chips.

Upon electrostatic deposition upon chips in the manner set forth under "Electrostatic Deposition" hereinbefore, at a temperature of 90° F., a fine even oxidation-stabilized hot spicy reddish coating is imparted to the chips.

EXAMPLE 7

Menhaden oil is tested for resistivity according to the foregoing "Procedure" and is found to have a resistivity greater than 500 megaohm-cm and is unsuitable for electrostatic deposition. The oil is modified by incorporation therein of 5% (w/w) standardized oleoresin paprika (80,000 ASTA color units), which itself has a resistivity of 5 megaohm-cm, and 5% (w/w) of oleoresin carrot.

The resulting solution has a resistivity of about 12 megaohm-cm and is suitable for electrostatic deposition upon food substrates such as dog biscuits.

Upon electrostatic deposition upon dog biscuits in the manner set forth under "Electrostatic Deposition"

hereinbefore, at a temperature of 90° F., a fine even slightly-flavored yellow coloring is imparted to the biscuits.

EXAMPLE 8

Corn oil is tested for resistivity according to the foregoing "Procedure" and is found to have a resistivity greater than 500 megaohm-cm and is unsuitable for electrostatic deposition. The oil is modified by incorporation therein of 5% (w/w) oleoresin carrot and 2% (w/w) of sage extract.

The resulting solution has a resistivity of about 15 megaohm-cm and is suitable for electrostatic deposition upon food substrates such as corn chips.

Upon electrostatic deposition upon chips in the manner set forth under "Electrostatic Deposition" hereinbefore, at a temperature of 90° F., a fine even oxidation-stabilized slightly-flavored yellow coating is imparted to the chips.

EXAMPLE 9

Safflower oil is tested for resistivity according to the foregoing "Procedure" and is found to have a resistivity greater than 500 megaohm-cm and is unsuitable for electrostatic deposition. The oil is modified by incorporation therein of 15% (w/w) standardized oleoresin capsicum (200,000 Scoville heat units), which itself has a resistivity of 4 megaohm-cm, and 1% (w/w) of garlic oil.

The resulting solution has a resistivity of about 40 megaohm-cm and is suitable for electrostatic deposition upon food substrates such as potato or corn chips.

Upon electrostatic deposition upon chips in the manner set forth under "Electrostatic Deposition" hereinbefore, at a temperature of 90° F., a fine even hot spicy garlic-flavored coating is imparted to the chips.

ADJUSTMENT WITH ORGANIC DILUENT—RESISTIVITY GOES DOWN

EXAMPLE 10

Soy oil is tested for resistivity according to the foregoing "Procedure" and is found to have a resistivity greater than 500 megaohm-cm and is unsuitable for electrostatic deposition. The oil is modified by incorporation therein of 10% (w/w) oleoresin cumin and 10% (w/w) of benzyl alcohol.

The resulting solution has a resistivity of about 10 megaohm-cm and is suitable for electrostatic deposition upon food substrates such as potato or corn chips.

Upon electrostatic deposition upon chips in the manner set forth under "Electrostatic Deposition" hereinbefore, at a temperature of 72° F., a fine even spicy coating is imparted to the chips.

The benzyl alcohol may be replaced by propylene glycol and polyethylene glycol.

EXAMPLE 11

Coconut oil is tested for resistivity according to the foregoing "Procedure" and is found to have a resistivity greater than 500 megaohm-cm and is unsuitable for electrostatic deposition. The oil is modified by incorporation therein of 1% (w/w) rosemary extract and 10% (w/w) of polyethylene glycol.

The resulting emulsion has a resistivity of about 100 megaohm-cm and is suitable for electrostatic deposition upon food substrates such as potato or corn chips or nuts.

The polyethylene glycol may be replaced by propylene glycol and benzyl alcohol, or a lower level of lecithin.

Upon electrostatic deposition upon chips or nuts in the manner set forth under "Electrostatic Deposition" hereinbefore, at a temperature of 90° F., a fine even oxidation-stabilized slightly rosemary-flavored coating is imparted to the food substrate.

EXAMPLE 12

Corn oil is tested for resistivity according to the foregoing "Procedure" and is found to have a resistivity greater than 500 megaohm-cm and is unsuitable for electrostatic deposition. The oil is modified by incorporation therein of 90% (w/w) oleoresin paprika, which itself has a resistivity of 5 megaohm-cm.

The resulting concentrated solution, upon dilution of one (1) part with twenty (20) parts (w/w) of soy oil, has a resistivity of about 90 megaohm-cm and is suitable for electrostatic deposition upon food substrates such as potato or corn chips.

Upon electrostatic deposition upon chips in the manner set forth under "Electrostatic Deposition" hereinbefore, at a temperature of 100° F., a fine even yellow coloring is imparted to the chips.

EXAMPLE 13

Melted lard is tested for resistivity according to the foregoing "Procedure" and is found to have a resistivity greater than 500 megaohm-cm and is unsuitable for electrostatic deposition. The oil is modified by incorporation therein of 30% (w/w) annatto extract.

The resulting concentrated solution, upon dilution of one (1) part with five (5) parts of 80/20 soy oil and OR capsicum, has a resistivity which is suitable for electrostatic deposition upon food substrates such as potato or corn chips.

Upon electrostatic deposition upon chips in the manner set forth under "Electrostatic Deposition" hereinbefore, at a temperature of about 80° F., a fine even orange coloring and spicy flavor is imparted to the chips.

EXAMPLE 14—FOUR TEST EXAMPLES 20A–D

Reference is made to the foregoing Procedure and Electrostatic Deposition sections for details of operation.

Preparations

Three samples containing various ingredients in 100 IV soy oil are prepared for use in electrostatic coating or deposition by means of the aforesaid ECTI device.

The test samples are electrostatically applied to the edible food substrate, e.g., corn tortilla or potato chips.

The edible food substrate, e.g., corn tortilla or potato chips, is placed on the tray and moved past the bar at a rate designed to deposit a suitable amount of material electrostatically thereupon.

The three samples contain:

A. 0.5% lecithin +0.03% Ascorbalox®, a registered Trademark of Kalsec, Inc., Type A antioxidant and 0.03% Herbalox®, a registered Trademark of Kalsec, Inc., Type O antioxidant.

B. 10% Durabrite®, a registered Trademark of Kalsec, Inc., Oleoresin Paprika in vegetable oil with antioxidant.

C. 12.8% Aquaresin®, a registered Trademark of Kalsec, Inc., BBQ Spice.

The results of these tests are shown in Table 9.

TABLE 9

Results of Electrostatic Spray Tests.

| Oil/Modifier Mixture | Resistivity at Temp. | % Pickup of Oil | Comments |
|---|---|---|---|
| 20 A. | 200 megaohm-cm 38 deg. C | na | Good fog, Good coverage. |
| 20 B. | 75 megaohm-cm 49 deg. C | 1 (0.5% per side) | Material Ran Well |
| 20 C. | 5 megaohm-cm 49 deg. C | 0.93% | Excellent Run |
| 20 D. (50/50 B + C) | 15 megaohm-cm | 2.65% | Excellent coverage |

The low oil pickup and control evidenced by these tests demonstrates that the technique is extremely useful in the preparation of lowfat snack food items.

It is therefore apparent that one skilled in the art can, by reference to the examples hereof and the accompanying tables, choose the appropriate food-grade edible base material selected from oil and fluid fat, which itself has a resistivity higher than the maximum of the range permitting electrostatic charging and deposition thereof at the temperature employed, and one or more edible organic additaments selected from the group consisting of food-grade flavorings and colorings and stabilizers, and if necessary or desirable one or more resistivity-modifying additaments selected from the group consisting of food-grade diluents, and by such a selection and temperature control arrive at a liquid flavoring, coloring, or stabilizing composition which has a resistivity which is suitable for electrostatic charging and deposition at the temperature to be employed, thereby to effect electrostatic deposition thereof upon an edible food substrate for the purposes of flavoring, coloring, or adding stability thereto, all of the ingredients of the composition being food-grade edible and ingestible materials, all as further described in detail elsewhere throughout this Specification.

The use of this technology is not limited to the coating of snack foods. It may also be applied to the coating of animal feeds, dried pet foods, cereal and the like. It is also useful in the application of food-grade antioxidants and sealants to act as moisture barriers and stabilizers for food substrates such as raisins and nuts.

We have shown the following:

1. The electrical resistivity of vegetable oils (and related materials such as liquified animal fats, shortening, etc.) can be altered by the addition of certain edible flavoring, coloring, or stabilizing agents, or diluents, alone or in combination, so that the resulting solution, emulsion, or dispersion can then be electrostatically atomized and sprayed.
2. Temperature can be used in combination with the additives for additional control of the resistivity of the resulting composition.
3. The modified liquid vegetable oils or fats can be used to carry flavoring agents, coloring agents, or antioxidants which by their nature or concentration do not by themselves possess sufficient ability to adequately modify the base material resistivity on their own. For example, black pepper oil or oleoresin in soy oil can be electrostatically applied to a food substrate if an appropriate amount of oleoresin paprika is added.
4. The modified oils or fats can be used to carry other useful additives onto the food substrate to be coated.
5. The process has been demonstrated on commercially-available equipment. We have shown that we can apply food flavorings, colorings, and stabilizers, such as antioxidants, as well as further additaments if required or desired, to snack foods and other food substrates in a single, economical application which is uniform and controllable.

It is therefore seen from the foregoing that an edible liquid flavoring or seasoning, coloring, or stabilizing composition suitable for electrostatic charging and deposition upon an edible food substrate, a method for the electrostatic deposition thereof upon the food substrate, and the treated or coated edible food substrate product, as well as a method for the adjustment and control of the resistivity of an edible liquid base material, using an edible flavoring or seasoning, coloring, or stabilizing agent, if necessary or desirable together with an edible diluent, so as to make it suitable for electrostatic deposition upon an edible food substrate, wherein all of the components of the composition are edible and ingestible, have been provided according to the present disclosure, and whereby all of the objectives of the present invention have accordingly been realized.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. A method for the adjustment and control of the resistivity of an edible base material, selected from oils and fluid fats having a resistivity in excess of 300 megaohm-centimeter, by combining said base material with one or more edible resistivity modifiers to provide a liquid composition having a resistivity of 0.05 to 300 megaohm-centimeter and which is suitable for electrostatic charging and deposition of an edible flavoring agent, coloring agent, or stabilizing agent upon an edible food substrate at the temperature employed, consisting of the steps of:

admixing with the base material one or more edible resistivity modifiers to bring the composition within a resistivity range of 0.05 to 300 megaohm-centimeter; and selecting said edible resistivity modifiers from the group consisting of:

edible food-grade organic flavoring agents, coloring agents, stabilizing agents selected from the group consisting of ascorbic acid, rosemary extract, sage extract, other Labiatae natural antioxidant extracts, phosphates, catechins, BHT(butylated hydroxytoluene), BHA(butylated hydroxyanisole), TBHO(tert-butylhydroquinone), tocopherols, and mixtures thereof; and organic diluents which are food-grade ingredients selected from the group consisting of propylene glycol, polyethylene glycol, glycerine, and benzyl alcohol, the selected resistivity modifier or modifiers having a resistivity of less than 300 megaohm-centimeter, wherein the percentage of flavoring, coloring, and stabilizing agents included in the liquid composition is at least about 3% by weight.

2. A method of claim 1 wherein the liquid composition suitable for electrostatic charging and deposition has a resistivity of 1 to 150 megaohm-centimeters and wherein one or more edible resistivity modifiers are admixed with the base material to bring the composition within the resistivity range of 1 to 150 megaohm-centimeters.

3. A method for the production of a coated or treated edible food substrate involving the adjustment and control of the resistivity of an edible base material, selected from oils and fluid fats having a resistivity in excess of 300 megaohm-centimeter, by combining said base material with one or more edible resistivity modifiers to provide a liquid composition having a resistivity of 0.05 to 300 megaohm-centimeter and which is suitable for electrostatic charging and deposition upon an edible food substrate at the temperature employed, consisting of the steps of:

admixing with the edible base material one or more edible resistivity modifiers to bring the composition within a resistivity range of 0.05 to 300 megaohm-centimeter;

selecting said edible resistivity modifiers from the group consisting of:

edible food-grade organic flavoring agents, coloring agents, stabilizing agents selected from the group consisting of ascorbic acid, rosemary extract, sage extract, other Labiatae natural antioxidant extracts, phosphates, catechins, BHT(butylated hydroxytoluene), BHA(butylated hydroxyanisole), TBHO(tert-butylhydroquinone), tocopherols, and mixtures thereof; and organic diluents which are food-grade ingredients selected from the group consisting of propylene glycol, polyethylene glycol, glycerine, and benzyl alcohol, the selected resistivity modifier or modifiers having a resistivity of less than 300 megaohm-centimeter; and then electrostatically depositing the liquid composition upon said edible food substrate, wherein the percentage of flavoring, coloring, and stabilizing agents included in the liquid composition is at least about 3% by weight.

4. A solid edible food substrate electrostatically coated or treated with an edible liquid composition produced by the method of claim 2.

5. A method of claim 3, wherein the base material is selected from the group consisting of vegetable oils, fish oils, and a liquified or melted animal fat or shortening.

6. A method of claim 3, wherein the base material is selected from the group consisting of coconut oil soy oil, almond oil, peanut oil, cottonseed oil, canola oil, palm oil, olive oil, rice grain oil, corn oil, and safflower oil; lard, tallow, mutton fat, beef fat, turkey fat, chicken fat, and pork fat; menhaden oil, herring oil, sardine oil, and cod oil.

7. A method of claim 3, wherein the edible food substrate treated or coated is selected from the group consisting of potato or corn chips, crackers, cookies, dry foods, nuts, cereals, grains, dry pet foods, and animal feeds.

8. A method of claim 3, wherein the flavoring agent is capsicum oleoresin; wherein the coloring agent is selected from the group consisting of paprika oleoresin, carrot oleoresin, and chlorophyll; and wherein the stabilizing agent is phosphate.

9. A method of claim 8, wherein additional flavoring agents are selected from the group consisting of char oil, onion oil, garlic oil, butter flavoring, cheese flavoring, black pepper oil, oleoresin cumin, oleoresin cardamon, and oleoresin ginger; coloring agents are selected from the group consisting of annatto extract, turmeric pigment, and FD&C colors; and stabilizing agents are selected from the group consisting of ascorbic acid, rosemary extract, sage extract, and other Labiatae natural antioxidant extracts.

10. A method of claim 3, wherein the base material is a vegetable oil.

11. A method of claim 3, wherein the base material is soy oil and a selected resistivity modifier is oleoresin paprika or oleoresin capsicum.

12. A method of claim 3, wherein the percentage of flavoring, coloring, and stabilizing agents included in the liquid composition is between about 3% and 20% by weight.

13. A method of claim 3, wherein the composition is applied to both top and bottom surfaces of the edible food substrate simultaneously.

14. A method of claim 3, wherein the composition is applied sequentially to the top and bottom surfaces of the edible food substrate.

15. A method of claim 3, wherein, after the coating of the edible food substrate, one or more solid edible coating materials are applied to the edible food substrate.

16. A method of claim 3 wherein the liquid composition has a resistivity of 1 to 150 megaohm-centimeters and wherein one or more edible resistivity modifiers are admixed with the base material to bring the composition within the resistivity range of 1 to 150 megaohm-centimeters.

17. A method of electrostatically depositing upon an edible food substrate an edible liquid composition to coat or treat same, which is suitable for electrostatic deposition upon an edible food substrate to impart flavoring, coloring, or stability thereto, having a resistivity of 0.05 to 300 megaohm-centimeter and thus in a range permitting electrostatic charging and deposition thereof at the temperature employed, consisting of admixing the composition consisting essentially of:

(I) a food-grade edible base material selected from oils and fluid fats having a resistivity in excess of 300 megaohm-centimeter and which therefore itself has a resistivity higher than the maximum of the range permitting electrostatic charging and deposition and which is therefore not per se electrostatically chargeable and depositable, and (II) one or more edible food-grade organic additaments selected from the group consisting of (a) a flavoring agent, (b) a coloring agent, (c) a stabilizing agent selected from the group consisting of ascorbic acid, rosemary extract, sage extract, other Labiatae natural antioxidant extracts, phosphates, catechins, BHT (butylated hydroxytoluene), BHA(butylated hydroxyandsole), TBHO(tert-butylhydroquinone), tocopherols, and mixtures thereof; and (d) an organic diluent which is a food-grade ingredient selected from the group consisting of propylene glycol, polyethylene glycol, glycerine, and benzyl alcohol, said additaments (II) being dissolved, emulsified, or dispersed in said base material (I), the relative amounts of (I) and (II) being sufficient to bring the resistivity of the liquid composition within a range of 0.05 to 300 megaohm-centimeter and therefore permitting charging and deposition of said liquid composition on said edible food substrate at the temperature employed, at least one of (a), (b), (c), and (d) being a resistivity modifier which itself has a resistivity less than 300 megaohm-centimeter and therefore less than the maximum of the range permitting electrostatic charging and deposition, and electrostatically depositing the composition upon the edible food substrate, wherein total the percentage of (a), (b), and (c) additaments in the liquid composition is at least about 3% by weight.

18. A solid edible food substrate electrostatically coated or treated with an edible liquid composition according to the method of claim 17.

19. A method of claim 17 wherein the liquid composition has a resistivity of 1 to 150 megaohm-centimeters and wherein one or more edible resistivity modifiers are admixed with the base material to bring the composition within the resistivity range of 1 to 150 megaohm-centimeters.

20. A solid edible food substrate electrostatically-coated or treated with an edible liquid composition, which is suitable for electrostatic deposition upon an edible food substrate to impart flavoring, coloring, or stability thereto, having a resistivity of 0.05 to 300 megaohm-centimeter and thus in a range permitting electrostatic charging and deposition thereof at the temperature employed, which composition consists essentially of:

(I) a food-grade edible base material selected from oils and fluid fats having a resistivity in excess of 300 megaohm-centimeter and which therefore itself has a resistivity higher than the maximum of the range permitting electrostatic charging and deposition and which is therefore not per se electrostatically chargeable and depositable, and (II) one or more edible food-grade organic additaments selected from the group consisting of (a) a flavoring agent, (b) a coloring agent, (c) a stabilizing agent selected from the group consisting of ascorbic acid, rosemary extract, sage extract, other Labiatae natural antioxidant extract, sage extract, phosphates, catechins, BHT(butylated hydroxytoluene), BHA(butylated hydroxyanisole), TBHO(tert-butylhydroquinone), tocopherols, and mixtures thereof; and (d) an organic diluent which is a food-grade ingredient selected from the group consisting of propylene glycol, polyethylene glycol, glycerine, and benzyl alcohol, said additaments (II) being dissolved, emulsified, or dispersed in said base material (I), the relative amounts of (I) and (II) being sufficient to bring the resistivity of the liquid composition within a range of 0.05 to 300 megaohm-centimeter and therefore permitting charging and deposition of said liquid composition on said edible food substrate at the temperature employed, (III) at least one of (a), (b), (c), and (d) being a resistivity modifier which itself has a resistivity less than 300 megaohm-centimeter and therefore less than the maximum of the range permitting electrostatic charging and deposition, wherein the total percentage of (a), (b), and (c) additaments in the liquid composition is at least about 3% by weight.

21. A food substrate of claim 20, wherein the base material is selected from the group consisting of vegetable oils, fish oils, and a liquified or melted animal fat or shortening.

22. A food substrate of claim 20, wherein the base material is selected from the group consisting of soy oil, almond oil, peanut oil, cottonseed oil, canola oil, palm oil, olive oil, rice grain oil, corn oil, safflower oil; lard, tallow, mutton fat, beef fat, turkey fat, chicken fat, or pork fat; menhaden oil, herring oil, sardine oil, or cod oil.

23. A food substrate of claim 20, wherein the edible food substrate treated or coated is selected from the group consisting of potato or corn chips, crackers, cookies, dry foods, nuts, cereals, grains, dry pet foods, and animal feeds.

24. A food substrate of claim 20, electrostatically-coated with an edible liquid composition wherein the composition includes one or more components selected from: a flavoring agent selected from the group consisting of char oil, onion oil, garlic oil, butter flavoring, cheese flavoring, black pepper oil, oleoresin cumin, oleoresin cardamon, and oleoresin ginger; a coloring agent selected from the group consisting of annatto extract, turmeric pigment, and FD&C colors; and a stabilizing agent selected from the group consisting of ascorbic acid, rosemary extract, sage extract, and other Labiatae natural antioxidant extracts.

25. A food substrate of claim 20 wherein the flavoring agent (IIa) is capsicum oleoresin; wherein the coloring agent (IIb) is selected from the group consisting of paprika oleoresin, carrot oleoresin, and chlorophyll; and wherein the stabilizing agent (IIc) is phosphate.

26. A food substrate of claim 20, wherein the base material (I) is a vegetable oil.

27. A food substrate of claim 20, wherein the base material (I) is soy oil.

28. A food substrate of claim 20, wherein the percentage of (a), (b), and (c) additaments in the liquid composition is between about 3% and 20% by weight.

29. A solid edible food substrate of claim 20, wherein the liquid composition has a resistivity of 1 to 150 megaohm-centimeters and wherein one or more edible resistivity modifiers are admixed with the base material to bring the composition within the resistivity range of 1 to 150 megaohm-centimeters.

* * * * *

UNITED STATES PATENT AND TRADEMARK OFFICE
CERTIFICATE OF CORRECTION

PATENT NO. : 6,010,726
DATED : Jan. 4, 2000
INVENTOR(S) : R.J. Evans and G.S. Reynhout Page 1 of 2

It is certified that error appears in the above-indentified patent and that said Letters Patent is hereby corrected as shown below:

Column 2, line 7: "150 megaphm-cm," should read:
-- 150 megaohm-cm, --. Page 3, line 11

Column 7, line 41: At the end of the line, after "agent," insert the word -- and --.

Column 10, line 12: At the beginning of the line, "hydroxyanisde)," should read:
-- hydroxyanisole), --.

Column 10, line 13: At the beginning of the line, "text-" should read: -- tert- --.

Column 18, line 30: Insert the word -- the -- between "event" and "diluent".

Column 21, line 67: Delete "or a lower level of lecithin".

Column 24, line 54: At the beginning of the line, "TBHO" should read: -- TBHQ --.

UNITED STATES PATENT AND TRADEMARK OFFICE
CERTIFICATE OF CORRECTION

PATENT NO. : 6,010,726
DATED : Jan. 4, 2000
INVENTOR(S) : R.J. Evans and G.S. Reynhout It is certified that error appears in the above-indentified patent and that said Letters Patent is hereby corrected as shown below:

Column 25, line 23: "TBHO" should read: -- TBHQ --.

Column 25, line 43: Insert a -- comma -- (,) after "coconut oil".

Column 26, line 43: "hydroxyandsole)," should read --hydroxyanisole), --; and "TBHO" should read -- TBHQ --.

Column 27, line 26: Delete the words "sage extract,".

Column 27, line 28: "TBHO" should read -- TBHQ --.

Signed and Sealed this

Twelfth Day of December, 2000

Attest:

Q. TODD DICKINSON

*Attesting Officer*      *Director of Patents and Trademarks*